INVENTORS
JAMES F. ENGLISH JR.
AND ANTHONY J. HORNFECK
BY Raymond W. Junkins
ATTORNEY

United States Patent Office 2,744,223
Patented May 1, 1956

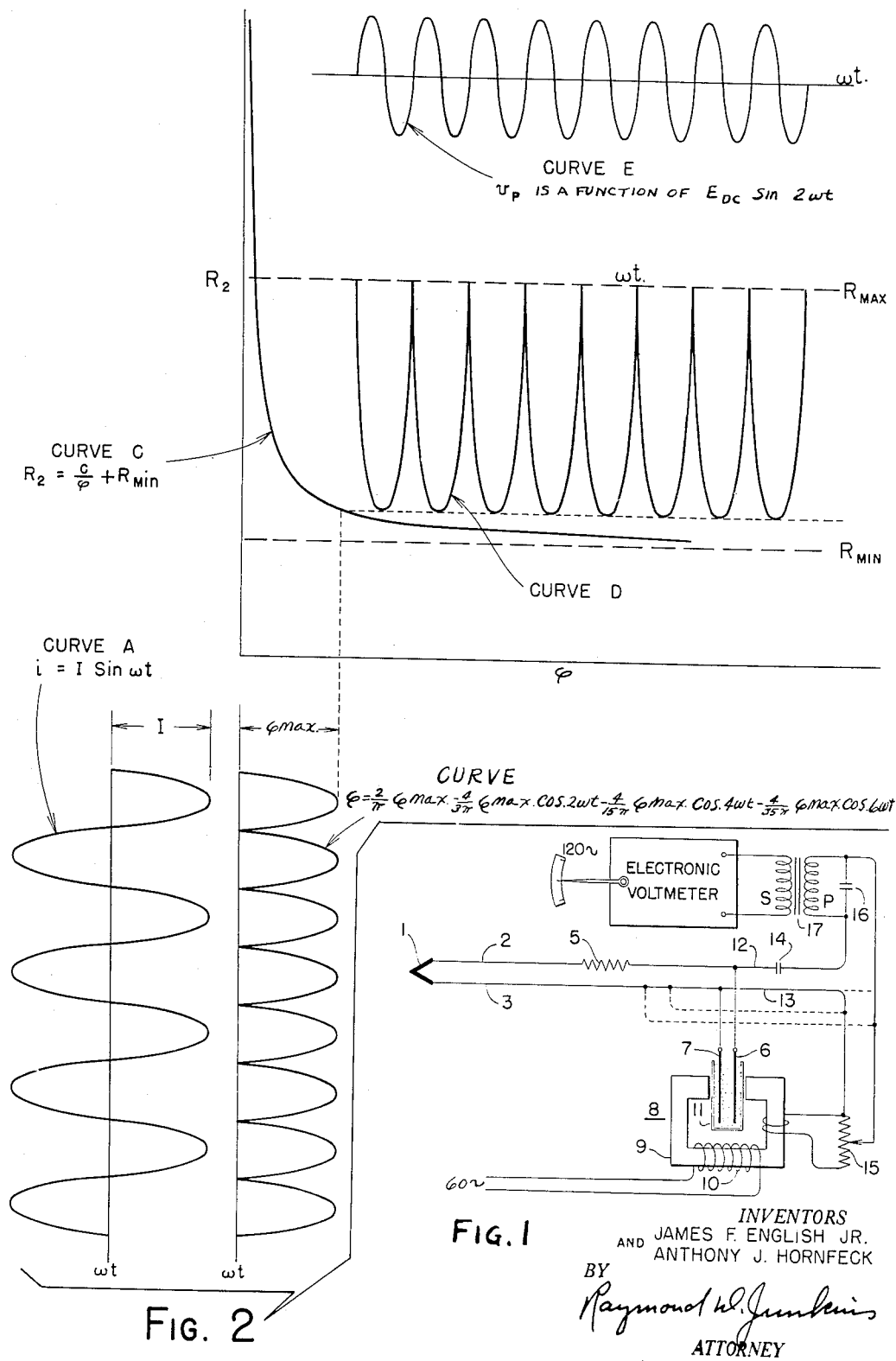

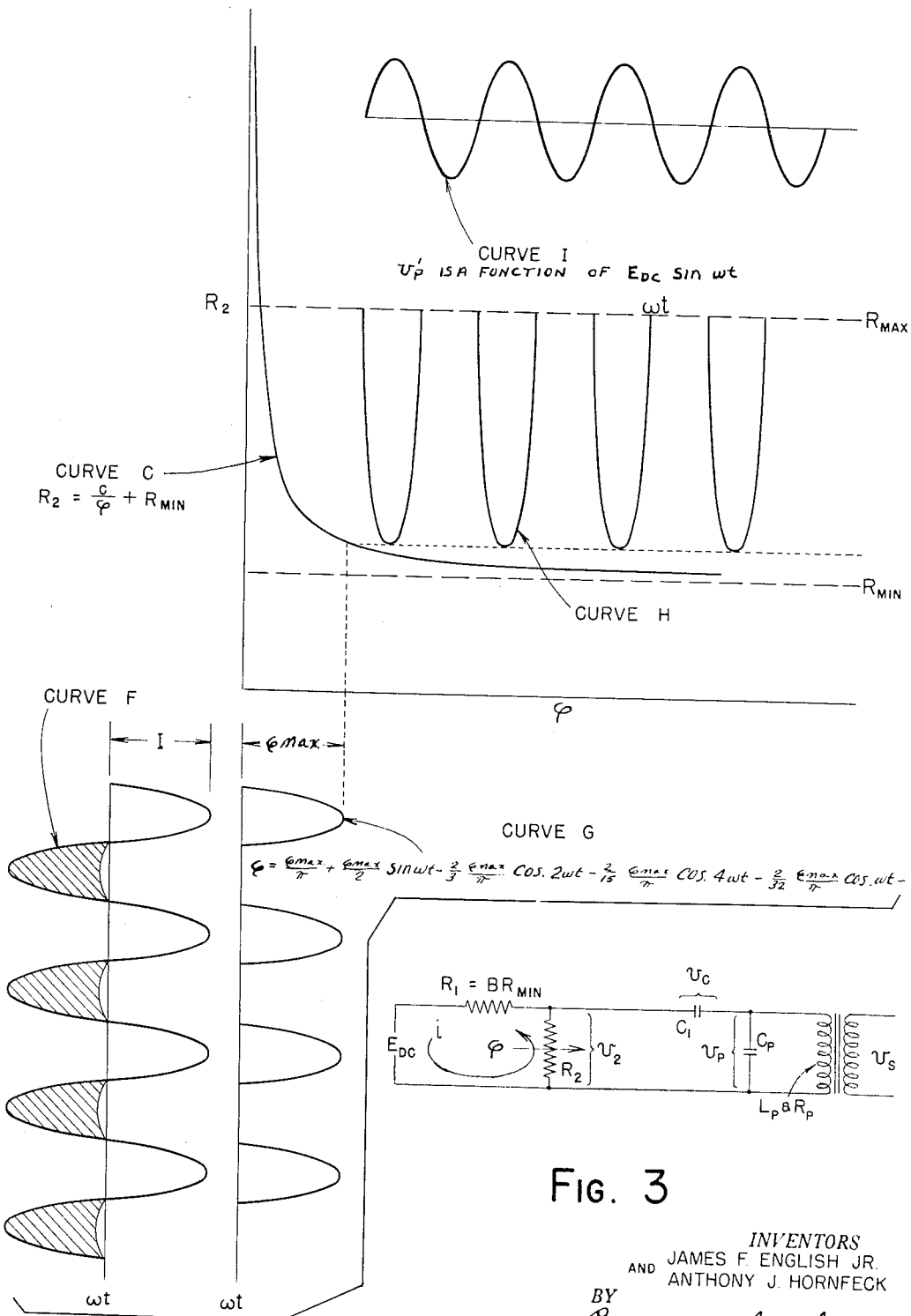

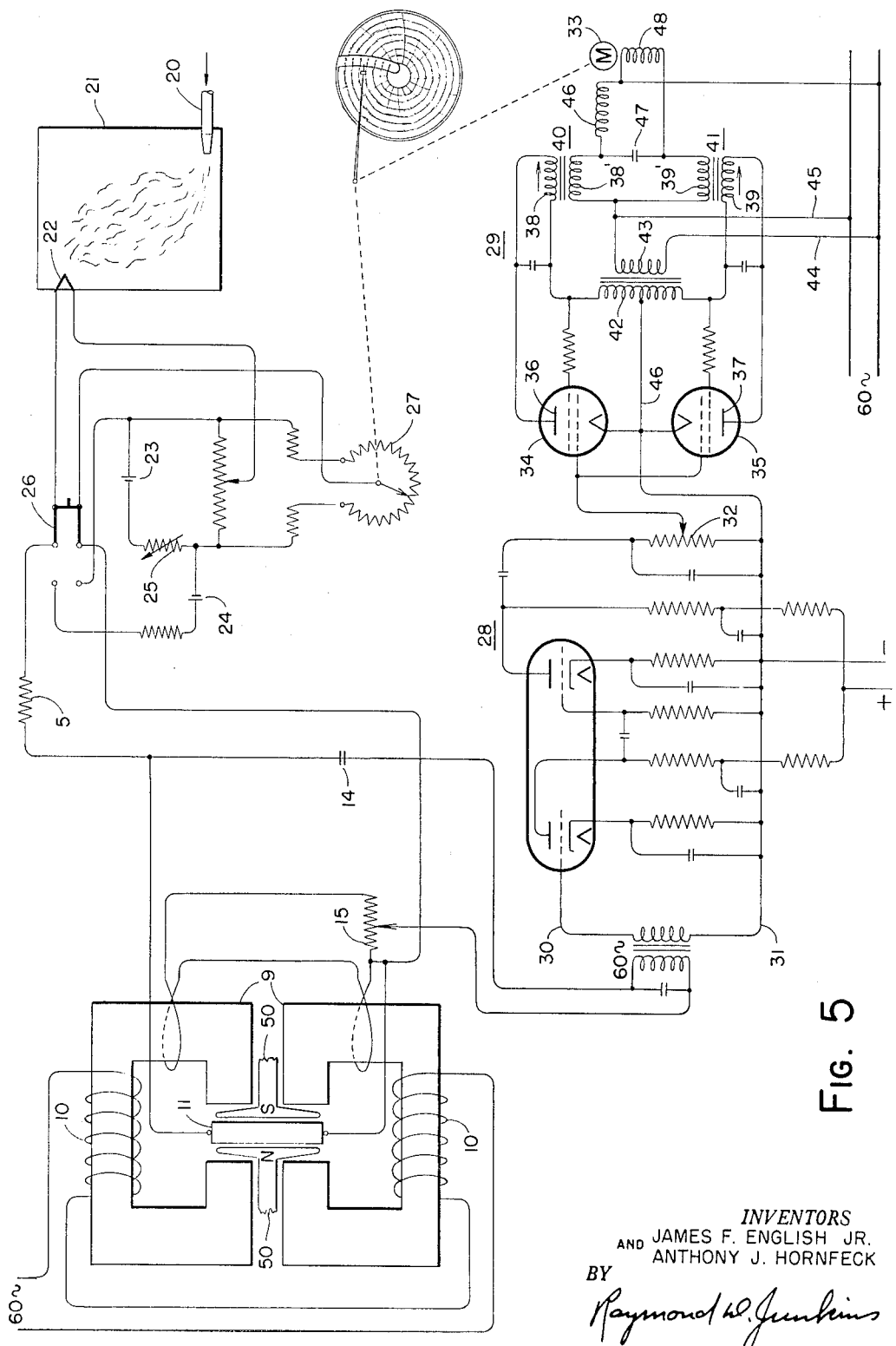

2,744,223

SERVO SYSTEM, INCLUDING ELECTRICAL INVERTER CIRCUIT

James F. English, Jr., Lakewood, and Anthony J. Hornfeck, Lyndhurst, Ohio, assignors to Bailey Meter Company, a corporation of Delaware Application November 9, 1950, Serial No. 194,822

8 Claims. (Cl. 318—29)

Our invention relates generally to the conversion of electrical energy from one form to another.

More particularly, our invention is regarded as a converter of D.-C. voltage to proportional A.-C. values. To illustrate more clearly the structure of our invention in practical application we have disclosed a circuit embodying our invention and employing the relatively small D.-C. voltages of such devices as thermocouples subjected to a condition of temperature to be measured.

In the past low-level D.-C. voltages have been measured directly by means of delicate galvanometers or have been converted into proportional A.-C. values and amplified electronically in order to utilize more powerful meter movement. The more common converter means has been the vibrator switch, or the saturable core reactor as disclosed in the patent to Hornfeck 2,529,450. The vibrator switch is a high speed device having mechanical wear difficulties inherent in such structure while the saturable core reactor is subject to drift characteristics.

It will be understood that once direct current is converted to alternating current there are available simple high-gain, stable amplifiers whose outputs can be used to operate a relatively powerful meter movement.

It is the principal object of our invention to provide an improved converter circuit for conversion of energy from one form to another.

It is a further object to provide an improved converter circuit for the conversion of low-level direct current to alternating current.

It is a further object to provide a converter circuit with substantially microscopic part movement and which may be of extremely simple and stable construction.

Still another object is to provide such a converter that is inherently stable and does not require periodic comparison with a standard for calibration or drift.

It is a purpose of our invention to utilize the property of change in resistance to passage of direct current through a magnetic fluid when the fluid is subjected to an alternating flux.

A further object is to provide an improved adjustable or controllable electrical resistance having novel characteristics.

In the drawings:

Fig. 1 is an elemental circuit embodying our invention.

Fig. 2 is a graphical disclosure of variables in the operation of our invention.

Fig. 3 is a diagrammatic illustration of the equivalent electrical circuit of Fig. 1.

Fig. 4 is a graphical analysis of variables in an embodiment of our invention.

Fig. 5 is an arrangement of one embodiment of our invention in a standard measuring circuit.

Figure 6:
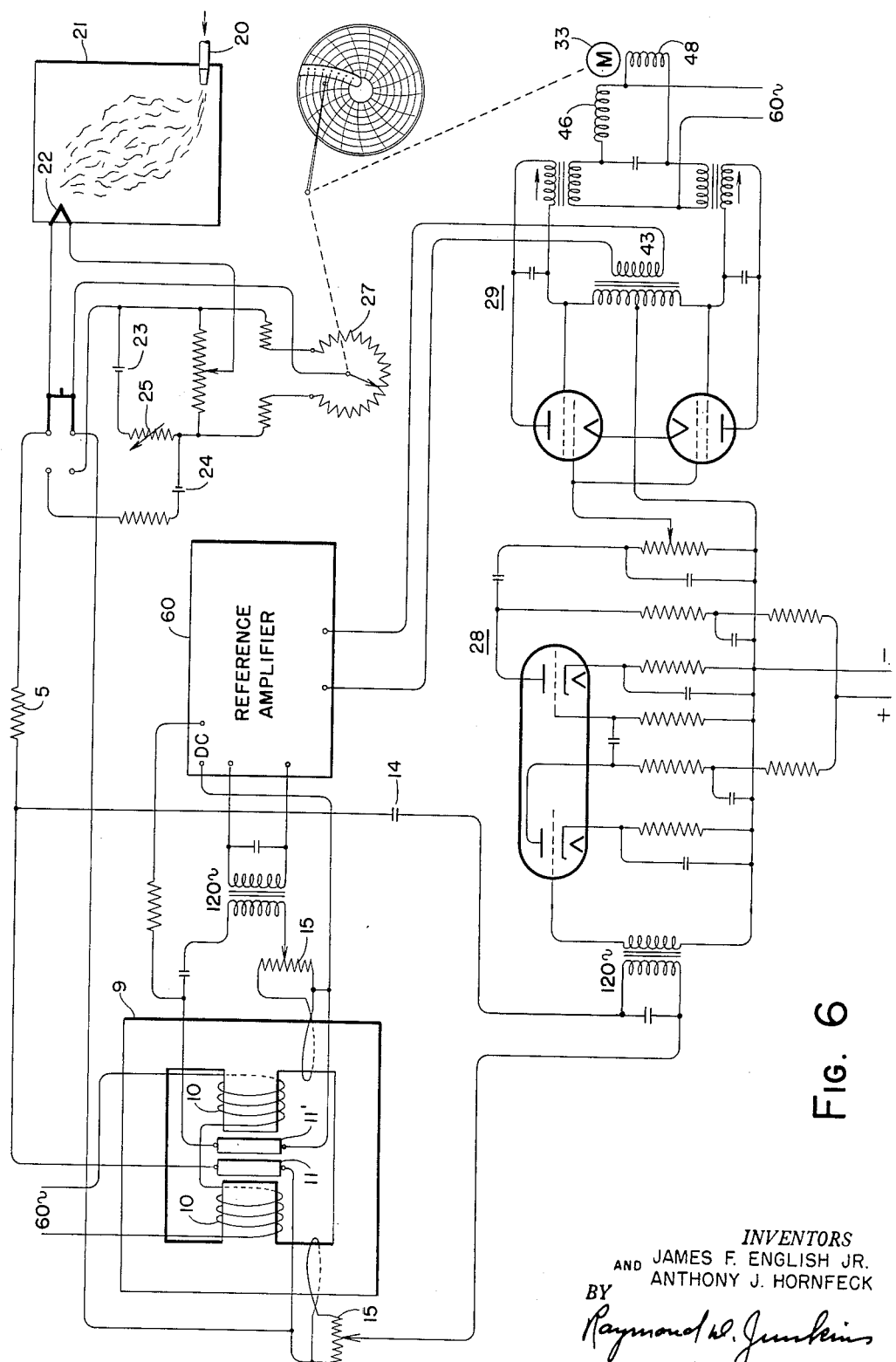
Fig. 6 illustrates the inclusion of another embodiment of our invention in the standard measuring circuit of Fig. 5.

Referring now to Fig. 1, a thermocouple 1 is disclosed as a means representative of a source of low level direct current which is to be measured as it changes in accordance with the variable. The thermocouple is initially considered in its inclusion within a first circuit comprising the thermocouple, conductors 2 and 3, resistance 5 and electrodes 6 and 7 connected through an electrical path forming an important element of our invention.

It is generally at 8 that we diagrammatically illustrate our converter assembly, including a magnetic core 9 having an exciting winding 10. Between the pole faces of the core 9 we disclose a cell, or container, 11 enclosing the pair of spaced electrodes 6 and 7 and filled with what we will only generally designate at this time as a magnetic fluid.

Experimentation has revealed that cell 11 may take any of numerous dimensions to cause the inventive structure to perform most efficiently in the various applications. From the diagrammatic representation here we may picture the cell as a comparatively thin wafer between its magnetic poles and of a non-magnetic material such as one of the plastics. Insulation between the electrodes, other than through the magnetic fluid, is facilitated with such material which additionally guards against physical leakage of the fluid.

The form for the electrodes may be screen-like for paralleling the pole faces of 9, and for approaching a desideratum in most applications they would have a total flat area equal to or somewhat greater than the face area of a pole. Of course this area is not critical but may vary from application to application.

In Fig. 1 we illustrate this first circuit as paralleled by a second circuit it might be said to serve. Conductors 12 and 13 pick up the potential drop produced across electrodes 6 and 7; and capacitor 14, adjustable resistance 15, capacitor 16 and primary of transformer 17 can be said to complete this second circuit.

We have briefly designated at 15 a potentiometer which is included in an induction circuit associated with core 9. Considering core 9 and all its windings, it can be appreciated that the conductors of these windings will have undesirable E. M. F.'s induced in them from the electromagnetic field generated by coil 10. These undesirable E. M. F.'s will have a fundamental as well as other spurious frequencies. The potentiometer 15, selecting a portion of the signal induced in its winding on core 9, nullifies the undesirable E. M. F.'s which are induced in the second circuit conductors. We have illustrated the more obvious points at which this A.-C. pick-up nullifier, as we term it, may be placed in our circuits.

In preparing the magnetic fluid which links electrodes 6 and 7 together we have utilized the electrical properties of a mixture made up of a fluid such as oil, finely divided solid material which is easily magnetized, such as iron, and finely divided solid material such as graphite which has a constant and relatively low electrical resistance. The question might be asked why iron alone does not provide both an easily magnetized property as well as the property of low electrical resistance. However, the surface of iron is relatively easy to soil with oxides or other film which progressively alter its resistance while graphite is relatively resistant to such effects. Therefore, the graphite mixed with iron is one of our solutions to the problem.

As the iron particles are acted upon by the magnetic flux of 9 they "squeeze" the intermixed graphite particles and form a lower resistance electrical path by means of the closer association obtained between these particles. With the fluid in cell 11 traversed by the flux field of 9, it forms an electrical path between electrodes 6 and 7 whose resistance is a function of the strength of the traversing flux field. It is this property of fluid mixtures of this nature which we utilize in a unique and novel structural combination.

The question arises as to what proportions of fluid and iron and graphite are best for this application. An absolutely dry mixture of graphite and iron results in an operation which is relatively insensitive when compared to mixtures with some oil. Ease of particle movement is desired to promote formation of electrical paths through the mixture, and the lubricating properties of oil help this action. A mixture which is of the consistency of common paste appears satisfactory. Increase of the fluid content of the mixture above this point gains nothing in particle movement and reduces the conductivity level of the cell below that needed for commercial use. Also a lower viscosity will encourage mechanical settling of the solid particles from the liquid and raise problems of performance variation while no gain otherwise is notable.

Other means of obtaining the solid portion of a mixture of this desirable property are readily perceived. The iron particles may be coated with copper to reduce the cell resistance within practical range of very small D.-C. voltages. The copper readily oxidizes, however, and precautions when plating the iron and sealing the cell 11 must be used. The plating will have to be done in a vacuum or in a reducing atmosphere and such protection maintained until the mixture is sealed in the cell.

Assuming the problems of cell construction and mixture formation solved, we apply constant sinusoidal voltage to winding 10. The common 60 cycle supply is contemplated. Referring to the graphical analysis of Fig. 2, we have formed curve A to represent the lagging sinusoidal current which flows under the voltage and in the coil 10, if a linear B—H (induction curve) relationship is existing in core 9. Core 9 can be constructed to give a satisfactory approximation to this relationship.

The resultant magnetic flux through the core 9 and cell 11 can also be considered as following a similar sine function. However, since the electrical resistance to current flow in the cell depends on the magnitude of the flux without respect to polarity of the current producing the flux, the force of the flux on the cell mixture can be represented by a unidirectional series of pulses such as shown by curve B. It is readily observed by those skilled in this art who possess an elemental understanding of electrical circuit mathematics that curve B contains a very large second harmonic with respect to the remaining periodic functions of its series.

For purposes of illustration we have assumed a relationship between cell resistance and flux as a generalized rectangular hyperbola in curve C. Curve B has been arranged in logical relation to the axis of these curves, and we have marked off within minimum and maximum limits a reasonable working portion of curve C. We can then project curve B upon curve C from the maximum resistance limit and secure a resistance-time curve we call curve D which is characteristic of the cell.

With the cell's resistance established as varying along curve D we return to an analysis of the cell's relation to the other circuit components by means of Fig. 3 wherein we have diagrammatically represented the circuit components, the cell being symbolized by the equivalent resistance $R_2$ traversed by the force of the magnetic flux. Therefore, for the instantaneous current in the first loop:

$$i = \frac{E_{DC}}{R_1+R_2} = \frac{E_{DC}}{BR_{min}+\frac{C}{\phi}+R_{min}}$$

$$= E_{DC}\left(\frac{\phi}{\phi R_{min}(B+1)+C}\right)$$

Therefore the instantaneous potential drop across $R_2$:

$$V_2 = E_{DC}\left(\frac{\phi}{\phi R_{min}(B+1)+C}\right)\left(\frac{C+\phi R_{min}}{\phi}\right)$$

$$= E_{DC}\frac{C+\phi R_{min}}{\phi R_{min}(B+1)+C}$$

where C, $R_{min}$, $\phi$ and B are constants and $E_{DC}$ the independent variable.

$$\phi = \frac{2}{\pi}\phi_{max} - \frac{4}{3\pi}\phi_{max}\cos 2\omega t - \frac{4}{15\pi}\phi_{max}\cos 4\omega t -$$

$$\frac{4}{35}\frac{\phi_{max}}{\pi}\cos 6\omega t \ldots$$

Where:
$I$=max. value of energizing current.
$i$=instantaneous value of energizing current.
$\phi_{max}$=max. force on the cell particles.
$\phi$=instantaneous force on the cell particles.
$B$=factor dependent on absolute resistance value of R.
$R_2$=cell resistance.
$C$=constant determining the shape of the rectangular hyperbola of the cell resistance.
$R_{min}$, $R_{max}$=max. and min. values of range of cell resistance chosen.
$\omega = 2\pi \times$ frequency of applied voltage.
$Z_m$=max. dynamic resistance.
$R_{C1}$=resistance of the capacitor $C_1$ As the harmonics higher than the second are comparatively small, we may consider that the magnetic force $\phi$ consists only of the steady state component $$\frac{2}{\pi}\phi_{max}$$

and the alternating factor $$\frac{4}{3\pi}\phi_{max}\cos 2\omega t$$

Fig. 3 shows a circuit in parallel with the cell $R_2$ and having in series a capacitance $C_1$ with the primary coil $L_p$ of a step-up transformer. An additional capacitor $C_p$ is placed in parallel with $L_p$, the value being chosen to give the frequency $$\omega = \frac{1}{\sqrt{L_p C_p}}$$

which will resonate with the second harmonic of the frequency of the applied voltage.

Curve E then represents the sinusoidal form of the resonant drop across the wave trap formed of $C_p$ and $L_p$, being a function of the variable $E_{DC}$ and the constant sinusoidal factor $\sin 2\omega t$. Curve E then represents the form of the final output and because of the inherent nature of circuit components, has a frequency just twice the exciting voltage. A change in polarity of the D.-C. component of this function has the conventional result of shifting the phase of the sinusoidal function 180°.

The secondary may be considered open circuited because any utilization made of the circuit output would employ the high grid impedance of the first stage of electronic amplification necessary to raise the signal to a useful level. $v_s$ then may be readily determined by the turn-ratio factor between the primary and secondary of the step-up transformer.

In a majority of practical, commercial applications the alternating output frequency from our invention is required to be the same as that of the voltage exciting the magnetic field winding 10. We have determined at least two means of obtaining this result.

Perhaps the simplest method of obtaining the desired output is to give half wave rectification to the exciting current of coil 10. Secondly a permanent magnetic bias structure may be provided to influence the flux in the core 9 in a manner, hereafter to be described, for obtaining the same result.

In either procedure the effect is the same and can be graphically analyzed as we have done in Fig. 4. In Fig. 4 curve F is used to demonstrate the generalized shape of the wave form of the rectified current, assuming operation well below core saturation. The cross-hatched sections are then those wave portions removed from the applied current by the rectification. The resulting flux pulses in core 9, produced by this rectified current, or the cancelling effect in one direction obtained by a permanent magnetic structure, are delineated by curve G. This wave form of the flux is mathematically analyzed and found to contain, principally, a steady state component $$\frac{\phi_{max}}{\pi}$$

and a first harmonic $$\frac{\phi_{max}}{2} \sin \omega t$$

The remainder of the graphical relations of the cell resistance to current induced to flow under the magnetic flux pulses and the form given the final output is essentially what was shown by Fig. 2. The voltage drop across the primary of the output transformer may be made to resonate with the first harmonic (fundamental) by proper choice of parallel capacitance. This resonant voltage is $v'_p$ in curve I of this Fig. 4 and is a function of $E_{DC}$ and the constant sinusoidal frequency $\sin \omega t$.

The problems attendent the employment of a permanent magnet structure to obtain the desired output for our invention have been given at least one solution in our disclosure of Fig. 5. Here our invention is employed to convert the D.-C. voltage unbalance of a potentiometric network including a thermocouple, subject to the heat of a space, into an A.-C. voltage capable of actuating a common form of indicating and/or recording circuit.

Heated from the burner 20, space 21 has its temperature sensed by thermocouple 22 whose voltage is balanced across the bridge against the constant, known voltage of a dry cell battery 23. A standard cell is maintained at 24 for substituting in place of cell 23 as the reference voltage to enable a calibration, or standardization, of the system by manipulation of adjustable resistance 25 when switch 26 is thrown from its position shown. The actual operation of a network of this type is well known, voltage difference between 23 and 22 being reduced by adjustment of bridge resistance 27 by a network sensitive to the voltage difference in magnitude and direction.

It is the sensitive network with which we are immediately concerned in this application of our invention. Amplifying and motor control network as we show at 28 and 29 are familiar devices in this art as illustrated by Hornfeck 2,437,603.

The amplifier 28 is sensitive to the voltage between conductors 30 and 31 and produces a voltage drop in resistance 32 proportional to the voltage applied to it and of a corresponding phase but greatly amplified.

The motor control circuit 29 is connected to the amplifier output terminals and controls the operation of a motor 33, which is operatively connected by suitable means to the contact of resistance 27 for moving the latter in a direction to rebalance the circuit. Simultaneously, of course, the means between the motor 33 and resistance 27 contact may also be mechanically linked to an indicating or recording mechanism for visual manifestation of the variable value. The control circuit includes tubes 34 and 35 having anodes 36 and 37 connected, respectively, through windings 38 and 39 on saturable reactors 40, 41 to opposite ends of the secondary winding 42 of a power transformer having a primary winding 43 connected by conductors and to a reference voltage of frequency equal to that of input applied to conductors 30 and 31. For operation of these networks the frequencies at these points must be equal to each other, therefore it is desirable that sources common, or equivalent in this respect be supplied. The cathodes of the tubes 34, 35 are connected to a conductor 46 which is connected in turn to one end of the resistance 32 and to the mid-point of the secondary winding 42. Grids of the tubes 34, 35 are connected to a movable contact for the resistance 32.

These circuits including the potentiometer and amplifying-motor control networks with our cell are to be compared with Figs. 1 and 3. The $E_{DC}$ of Fig. 3 is produced in Fig. 5 by the potentiometer circuit, and the $v_s$ output is applied to the amplifying-motor control network. As explained in connection with Fig. 3, the polarity change of $E_{DC}$ will shift the phase of the alternating output of the circuits 180°.

The amplifier 28 is sensitive to the phase of a voltage applied to it, and as the phase of the voltage applied across 30, 31 depends upon the direction of unbalance in the potentiometer network the conductivity of motor control tubes 34, 35 is thereby controlled. With one phase, output of the amplifier 28 causes the grid of tube 34 to be subjected to a potential at the proper time to permit current to pass from one end of the secondary winding 42 to the saturable core reactor winding 38 and the tube 34 to the mid point of the secondary winding. When the output of the amplifier is of opposite phase, the grid of tube 35 is energized in a manner to pass current from the opposite end of the secondary winding 42 through the saturable core reactor winding 39 and the tube 35 to the mid point of the secondary winding.

When the current passes through the windings 38, 39 of the saturable core reactors, the impedance of the flow of current through their windings 38', 39' will be greatly decreased. With the phase of the amplifier output such that the tube 34 permits current to flow through the circuit including the winding 38 while the tube 35 prevents the flow through the winding 39, then current will pass from the 60 cycle source through the winding 38' of the saturable core reactor and directly through the motor winding 46 to the other terminal of the 60 cycle source. It will also pass from the winding 38' through the condenser 47 and the motor winding 48 to the other terminal of the transformer. The current in winding 46 will then lead that in winding 48 and the motor will operate in one direction until it rebalances the thermocouple network by moving resistance 27.

When the amplifier output is reversed in phase, the tube 35 causes its currents to flow through the saturable core reactor winding 39, while the tube 34 prevents the flow of current through winding 38. Impedance of winding 39' is now low, and current passes from the source through winding 39' and the motor winding 48 to the other side of the source. Current also passes from the winding 39' through the condenser 47 and the winding 46 to the other side of the source. Current winding 48 now leads that in winding 46 and the motor operates in the opposite direction.

To provide that the low-level D. C. voltage in the thermocouple bridge is placed in an acceptable form for input to amplifier 28, we have provided the core structure 9 in Fig. 5 to perform the same function as core 9 in Fig. 1 but arranged in two sections as shown for effective cooperation with the permanent magnet structure and cell 11.

The problem of selectively restricting the flux growth through cell 11 is met by our structure which enables the permanent magnet flux to traverse the same cell faces traversed by the flux of core structure 9. Thus it might be seen how the results graphically depicted on Fig. 4 are obtained.

The permanent magnet 50 forms a bias to flux growth between the faces of core 9. As the alternating current in coils 10 causes the polarity of the faces of 9 to alternate and the flux to change direction, the magnetic structure 50 prevents the reversal of flux traversing the cell 11 as produced by the excitation of winding 10. The force pulses on the cell 11 mixture then take a sinusoidal wave form about an average value proportional to the D. C. flux of permanent magnet 50. The analogy of the graphical analysis of these relationships is seen as so close to that of Fig. 4 that specific curves would be a cumbersome addition. It is sufficient for understanding the operation to point out that the force pulsations on cell 11 have an effect on the resistance-flux curve of cell 11 similar to those depicted by curve G in Fig. 4. And there is produced a resistance-time curve similar to curve H, the operation and result following the effect of half-wave rectification of the exciting current.

It is conceivable that it would be desirable to design amplifier 28 and motor control circuit 29 for the employment of higher frequencies than the standard 60 cycles. Generally the employment of higher frequencies in equipment of this nature will allow reduction in size of the apparatus which is usually desirable. Fig. 6 discloses how our invention may be utilized to provide the necessary reference voltage with frequencies equal to the input of amplifier 28.

The over-all system is the same as that of Fig. 5. Our converter structure, however, has a single core 9. Although coils 10 could have been placed as in Fig. 5, they are shown here more closely associated with the cells 11 and 11' to gain efficiency in the magnetic structure. In any event, the flexibility of the component parts is hereby illustrated to meet the exigencies of design.

Cell 11 is arranged with a companion cell 11' between the pole faces of magnetic structure 9. The flux produced by energized coil 10 traverses both cells alike. Cell 11' is shown to be included in a simple circuit similar to those of Figs. 1 and 3, direct current being applied across its terminals from a reference. As in Figs. 1 and 3, the circuit of cell 11' produces a 120 cycle voltage which device 60 amplifies for energization of primary 43.

It is to be noted that this circuit of cell 11' forms a source of 120 cycle alternating current which remains constant in both magnitude and phase as differing from the circuit of cell 11. Therefore the signal of cell 11' is competent for reference use of this nature. Thus we have offered two practical embodiments of our invention with which to meet the problem of supplying a conventional amplifying-motor control circuit a signal in accordance with which selective operation of a balancing motor may be accomplished.

Our preferred magnetic fluid is a mixture of carbonyl "E" iron powder, graphite particles, and a low conductivity fluid such as a silicone oil, proportioned to a semi-viscous or pasty consistency. The fluid lubricates the particles in their movement and adds an insulating value, while the semi-viscous consistency retards settling of the particles from a homogeneous mixture and inhibits the coherer effect. Subjecting the cell to an alternating flux provides self-restoration or decoherer action.

While preferably useful with low voltage D. C. signals $E_{DC}$ the combination effectively removes the voltage value limits of the signal where resistance regulation changes to a switch action through the resistance suddenly breaking down. We therefore provide a highly improved resistance device.

Although we have selected but these circuits with which to illustrate our invention, it is quite conceivable other embodiments will fall within the scope of the appended claims.

What we claim as new and desire to secure by Letters Patent of the United States, is:

1. A measuring system including in combination; a thermocouple sensitive to a variable heat condition, a potentiometer system including the thermocouple and a balancing resistance, said potentiometer system producing a D.-C. signal of polarity and magnitude dependent upon the heat condition change; a converter circuit supplied the D.-C. signal including, an electro-magnetic structure whose exciting coil is delivered electrical energy pulsating at a predetermined fixed frequency and magnitude, a magnetically controlled resistance path associated with the flux field of the electro-magnet, and two electrodes connected by the path and delivering a converted signal; a permanent magnetic structure arranged with the path and its electromagnetic flux field so as to aid and retard the magnetization of the path during alternate pulsation cycles of the exciting energy, and means of resonating the wave form of the converted signal to a frequency equal to the predetermined frequency; means for amplifying the pulsating signal; a motor selectively actuated by the pulsating signal; and means positioned by the motor to balance the potentiometer system following an unbalance thereof caused by the variation in its D.-C. signal.

2. A measuring system including in combination, a balanceable network including a thermocouple and producing a D.-C. signal upon unbalance, an electro-magnetic structure, means of exciting the winding at a predetermined frequency, a first pair of electrodes in circuit with the balanceable network and arranged in the flux field of the electro-magnet with a path connecting them whose conductivity is dependent upon the flux field strength, a phase sensitive network connected to the first pair of electrodes through a capacitance, a second pair of electrodes in the flux field with a variable path connecting them, means of amplifying the A.-C. induced in the second pair of electrodes, and means applied with the A.-C. of the second pair of electrodes as a reference and controlled by the phase sensitive means to return the balanceable network to balance.

3. A controllable electrical resistance apparatus for converting direct current to alternating current of a predetermined frequency comprising in combination, a mixture of low conductivity fluid and finely divided ferromagnetic particles and graphite, spaced electrical conducting members contacting said mixture and providing terminals for a path including said mixture, an electromagnet having poles spanning the mixture between said members, an exciting winding for said magnet, a source of alternating current of said predetermined frequency for energizing the winding, coupled input and output circuits including said path, and a permanent magnet having poles also spanning said mixture and adapted to suppress the effect of said electromagnet for alternate half cycles whereby the output alternating current is of the same frequency as said source.

4. A controllable electrical resistance apparatus for converting direct current to alternating current comprising in combination, a mixture of low conductivity fluid and finely divided ferromagnetic particles and graphite, spaced electrical conducting members contacting said mixture and providing terminals for a path including said mixture, an electromagnet having poles spanning the mixture between said members, an exciting winding for said magnet, a source of alternating current for energizing the winding, coupled input and output circuits including said path, and a secondary winding on said magnet constructed and arranged to nullify alternating current induced in said circuits by the field of said magnet.

5. A converter of electrical energy from one form to another, including in combination, an electromagnet having opposed pole faces and an energizing winding, a cell or container associated with the magnet and subjected to the flux field of said poles, a magnetic fluid mixture in the cell having electrical resistance variable in accordance with the traversing flux, spaced electrical conducting members contacting said mixture and providing terminals for an electrical path including the mixture, a source of constant amplitude and frequency half-wave rectified A.-C. for the winding, a first loop circuit including a source of low-level D.-C. signal of varying magnitude and reversible polarity and the said terminals-mixture path, and a second loop circuit including a first capacitor and the primary of a transformer and a second capacitor shunting the primary and tuning it to resonate at the fundamental of said constant frequency and means associated with the primary selectively responsive to magnitude and phase of the A.-C. signal in the second loop.

6. The combination of claim 5 in which the source includes a biasing permanent magnet having poles also imposing a flux upon said cell, said permanent magnet being adjusted to neutralize the flux of the electro-magnet in one direction and amplify it in the other.

7. The combination of claim 5 including a second similar cell adjacent the first cell and included in a reference network providing a reference A.-C. voltage at the same frequency as the A.-C. signal for the selectively responsive means.

8. A converter of electrical energy from one form to another including in combination, an electro-magnet having opposed pole faces and an energizing winding, a cell or container associated with the magnet and subjected to the flux field of said poles, a mixture of copper coated ferro-magnetic particles and solid lubricant in the cell, spaced electrical conducting members contacting the mixture and providing terminals for an electrical path including the mixture, a source of constant A.-C. for the winding, a first loop circuit including a source of low-level D.-C. signal of varying magnitude and reversible polarity and the terminals-mixture path, a second loop circuit including the terminals-mixture path and means sensitive to the A.-C. signal as representative of the D.-C. signal, a potentiometer resistance having a selected portion included in series with the second loop circuit, and a third loop circuit including the potentiometer resistance and an energized winding therefore associated with the electro-magnet.

References Cited in the file of this patent

UNITED STATES PATENTS

| | | |
|---|---|---|
| 543,843 | Biggar | Aug. 6, 1895 |
| 1,596,558 | Sokoloff | Aug. 17, 1926 |
| 1,810,539 | Sokoloff | June 16, 1931 |
| 2,149,782 | Lucas | Mar. 7, 1939 |
| 2,364,483 | Side | Dec. 5, 1944 |
| 2,464,807 | Hansen | Mar. 22, 1949 |
| 2,500,953 | Libman | Mar. 21, 1950 |
| 2,512,325 | Hansen | June 20, 1950 |
| 2,551,265 | Hansen | May 1, 1951 |
| 2,571,915 | McCoubrey | Oct. 16, 1951 |
| 2,620,466 | Hagen | Dec. 2, 1952 |

FOREIGN PATENTS

| | | |
|---|---|---|
| 22,142 | Great Britain | of 1900 |
| 119,014 | Australia | Oct. 12, 1944 |